May 7, 1963 A. JESONIS 3,088,216
BIDIRECTIONAL LEVEL INDICATING DEVICE
Filed May 5, 1961
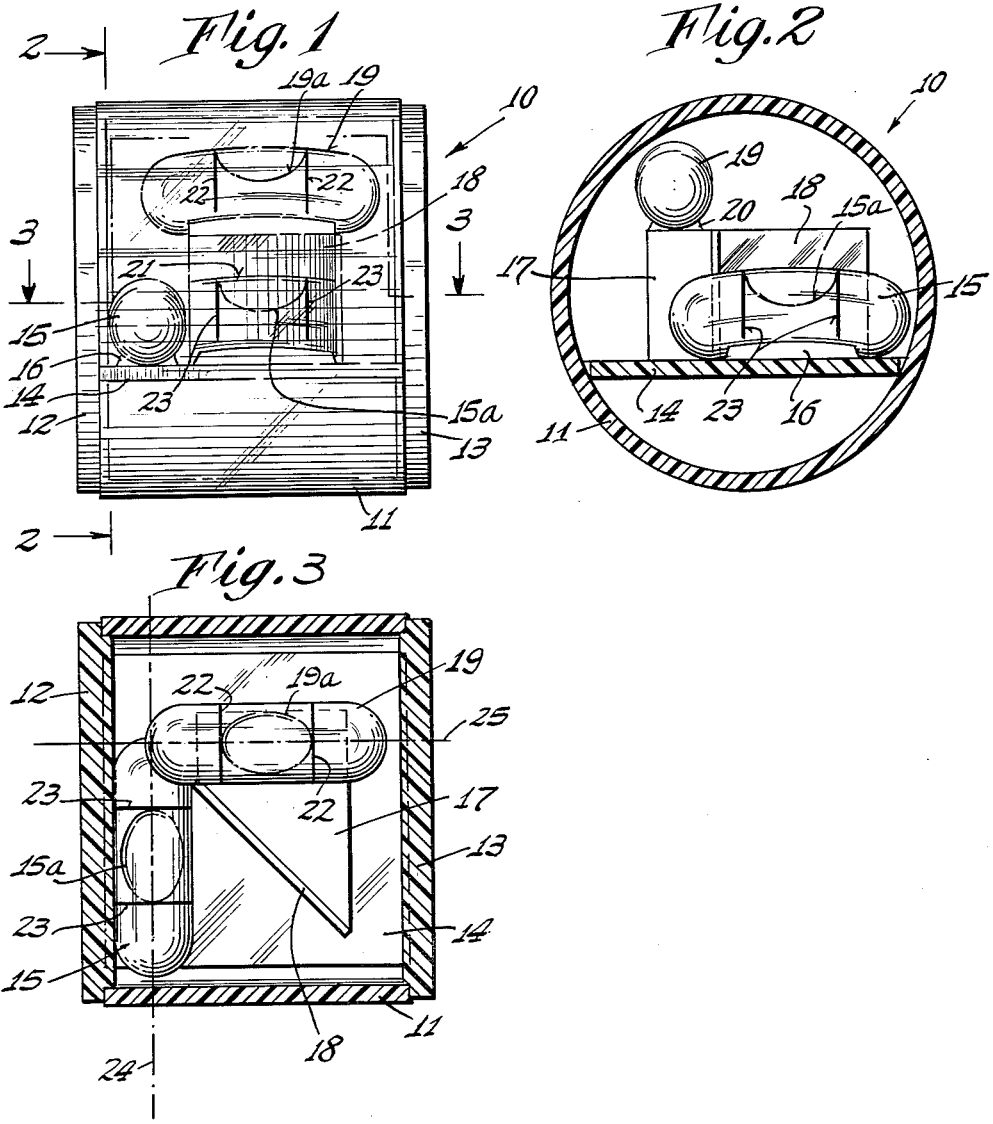
INVENTOR.
Alexander Jesonis
BY
Johnson and Kline
ATTORNEYS

3,088,216
BIDIRECTIONAL LEVEL INDICATING DEVICE
Alexander Jesonis, 1105 Ewing Ave., Clearwater, Fla.
Filed May 5, 1961, Ser. No. 108,071
2 Claims. (Cl. 33—211)

The present invention relates to a level device for indicating levelness in two directions, one being transverse preferably perpendicular of the other and more particularly in which the levelness of both directions may be observed by looking in only one direction at the device.

Heretofore when attempting to position a post vertically or a plate horizontally, for example, difficulty has been encountered by the requirement that a level indicating tool that is generally a spirit level has to be positioned in two directions, one being transverse to the other. Thus it was necessary for an operator to first position the spirit level to observe one direction and then move the spirit level transverse thereto (and also himself) in order to observe the spirit level in the other direction. This heretofore known practice is both time consuming and patience exhausting.

It is accordingly an object of the present invention to provide a level indicating device in which observation in one direction enables in effect two spirit levels to be observed that are mounted transverse to each other and to thereby provide an indication of the levelness in the two directions.

Another object of the present invention is to provide in a level indicating device of the above kind in which both observed spirit levels appear to be substantially identical, to extend in the same direction and to be substantially vertically aligned and thereby enabling an observer to be more aware of the deviation of the levelness in either direction.

A further object of the present invention is to provide a bidirectional level indicating device of the above type which is relatively economical to manufacture, easy to use and which as a unitary device has multiple applications.

In carrying out the present invention there is provided a pair of spirit levels of the type having a somewhat bowed cylindrical chamber formed from transparent material such as glass that is filled with liquid except for a small air pocket, which upon the spirit level being exactly horizontal is located between a pair of indicia marks. The axis of one spirit level extends at right angles to the other with preferably one spirit level being spaced slightly horizontally above the other.

A reflecting surface, such as a mirror, is positioned to bisect and thus be equidistant from the axis of the two spirit levels. Thus upon looking in one visual direction which is a direction perpendicular to the axis of one spirit level the one spirit level is directly observed while an image of the other is observed. The image is such as to have its indicia lines substantially vertically aligned with the indicia lines of the directly observed spirit level and in close proximity thereto to thereby enable an observer to quickly note if the bubbles of the spirit levels are spaced between their respective spaced indicia.

In order to provide a unitary device which may be employed in many different applications, the present invention mounts the two spirit levels and the reflective surface within a cylindrical casing that is formed from transparent material and which has at least one end also formed from transparent material. With this construction such a device may be easily positioned on and secured to ordinary levels, transits, cameras and machinery to provide for a bidirectional indication of levelness by looking in only one visual direction.

Other features and advantages will hereinafter appear.

Referring to the drawing:

FIGURE 1 is a front view of the bidirectional level indicating device of the present invention looking in the direction in which the device is viewed.

FIG. 2 is a section taken on the line 2—2 of FIG. 1.

FIG. 3 is a section taken on the line 3—3 of FIG. 1.

In the drawing the bidirectional level indicating device is generally indicated by the reference numeral 10 and includes a cylindrical tube 11, formed of transparent plastic material such as "Plexiglas," having secured thereto two circular end caps 12 and 13 also of transparent material to form a cylindrical chamber. Positioned within the chamber and secured to the interior of the tube 11 is a flat platform 14 that is in the specific embodiment shown located in the lower half of the chamber. A first spirit level 15 is secured as by glue 16 on the platform 14. Also secured on the platform is a substantially triangular cross-sectionally shaped block 17 that supports along its longer side a reflecting surface such as mirror 18. Mounted on top of the block 17 is another spirit level 19 that is substantially identical to the spirit level 15 and secured in place as by using glue 20, with the similar type of glue being employed to fasten the block 17 to the platform 14.

In carrying out the present invention it will be clear that an observer looking at the front of the device, such as shown in FIG. 1, observes not only the spirit level 19 but also observes an image 21 of the level 15 reflected by the mirror 18. Moreover, it will be clear that the apparent direction of extent of the image 21 is the same as that of the spirit level 19 and thus it appears to be the viewing of two, somewhat identical, spirit levels. Furthermore to aid in quickly determining the state of levelness as indicated by the two spirit levels, the indicia marks 22 of the spirit level 19 are substantially aligned with the indicia marks 23 of the spirit level 15 as appearing in the image 21. Thus an observer may quickly note if both directions are level by noting if an air bubble 19a of the spirit level 19 is between the indicia marks 22 and if the bubble 15a of the spirit level 15 is between the indicia marks 23 as shown in the image 21 reflected in the mirror 18.

The above view of the spirit levels is obtained by the construction of the present invention wherein the axis of the spirit level 15, as shown by a dotted line indicated by the reference numeral 24 is transverse to the axis of the spirit level 19, as shown by a dotted line indicated by the reference numeral 25. In particular these two axes are in effect perpendicular to each other though spaced in different planes. Moreover, according to the present invention the spirit levels 15 and 19 are substantially identical and the mirror 18 is a planar surface which is positioned to be equidistant from the two levels and thus in effect serves to bisect the angle formed between the two axes of the spirit levels. Thus the planar surface 18 extends transversely to both axes of the spirit levels.

It will accordingly be appreciated that the present invention provides for a bidirectional level indicating device which enables a viewer by observation in one direction to observe a state of levelness of the indicator in a direction transverse to the direction of viewing as indicated by the spirit level 19 and also to observe the state of levelness in a direction substantially parallel with the direction of viewing, as indicated by the image 21 of the spirit level 15 shown reflected in the mirror 18. Moreover, according to the present invention the two spirit levels are substantially identical such that a viewer observes in effect two closely spaced spirit levels having their indicia substantially aligned and may quickly note if the bubbles of the spirit levels are not located between the spaced indicia and thereby realize that the levels are not horizontal.

Variations and modifications may be made within the scope of the claims and portions of the improvements may be used without others.

I claim:
1. A bidirectional level indicating device for indicating in one visual direction both the levelness in that direction and in a direction transverse thereto comprising a first spirit level having an axis mounted to extend in the visual direction, a second spirit level having an axis mounted to extend transverse to the visual direction, each of said levels having the spaced indicia thereon and a planar reflecting means mounted to extend transverse to both axes to produce an image of the first spirit level in the reflecting means that has an axis extending parallel with the axis of the second spirit level and with the spaced indicia of the image being aligned with the spaced indicia of the second spirit level.

2. A bidirectional level indicating device for indicating in one visual direction the levelness in that direction and in a direction transverse thereto comprising a first spirit level having an axis mounted to extend in the visual direction, a second spirit level having an axis mounted to extend transverse to the visual direction, each of said levels having the spaced indicia thereon, a planar reflecting means mounted to extend transverse to both axes and equidistant therefrom to produce an image of the first spirit level in the reflecting means that has an axis extending parallel with the axis of the second spirit level and with the spaced indicia of the image being aligned with the spaced indicia of the second spirit level and a cylindrical casing formed from transparent material enclosing the two spirit levels and the reflecting means and having at least one end cover formed from transparent material.

References Cited in the file of this patent

UNITED STATES PATENTS

| | | |
|---|---|---|
| 2,331,616 | Minghetti | Oct. 12, 1943 |
| 2,466,829 | Sprinkel | Apr. 12, 1949 |
| 2,727,314 | Dossie et al. | Dec. 20, 1955 |